Figure 1:
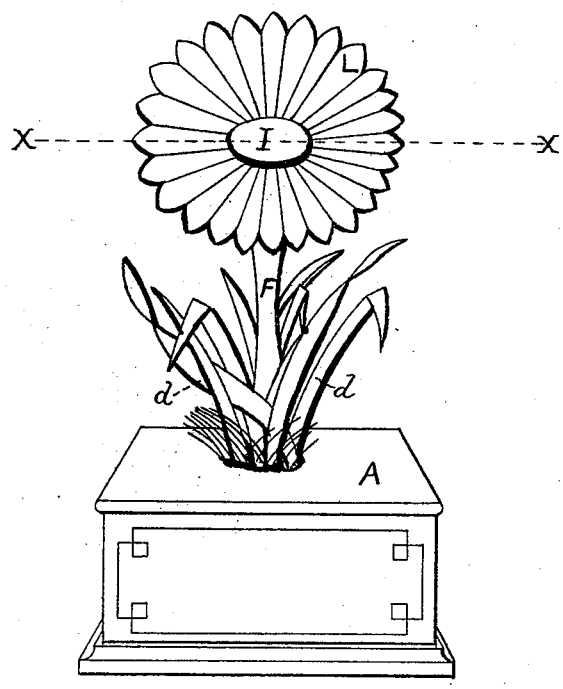

(No Model.)

J. E. WENGER.
MECHANICAL ARTIFICIAL FLOWER FOR ADVERTISING PURPOSES.

No. 530,870. Patented Dec. 11, 1894.

WITNESSES.
Eugene P. Eadson
E. B. Williams

INVENTOR.
John E Wenger
BY Geo. H. Holgate

ATTORNEY.

UNITED STATES PATENT OFFICE.

JOHN E. WENGER, OF PARADISE, PENNSYLVANIA.

MECHANICAL ARTIFICIAL FLOWER FOR ADVERTISING PURPOSES.

SPECIFICATION forming part of Letters Patent No. 530,870, dated December 11, 1894.

Application filed April 12, 1894. Serial No. 507,230. (No model.)

*To all whom it may concern:*

Be it known that I, JOHN E. WENGER, a citizen of the United States, residing at Paradise, in the county of Lancaster and State of Pennsylvania, have invented a new Improvement in Mechanical Artificial Flowers for Advertising or other Purposes, of which the following is a specification.

My invention relates to the improvement in mechanically operated artificial flowers, and the objects of my invention are: first, to make an artificial flower, so constructed that the leaves of the flower, or any other part, will open or close by mechanical means; second, to provide and make artificial flowers of any desirable material best adapted for the purpose, having the leaves forming the flower, to open or close by a simple and economical mechanical contrivance, and operated or controlled by an ordinary clock movement, or any other similar or suitable means of supplying the power to move the direct mechanism of the flower or flowers; third, to supply an artificial flower or flowers with an automatic device of opening and closing, adding to its attractiveness for decorative and general use; fourth, to form an illusive and highly ornamental medium for advertising purposes.

I accomplish the objects of my invention by constructing a base pedestal or box which may be made in any desired form and composed of any suitable material. This base is large enough to receive any ordinary clock movement, or its equivalent, as a source of power, and forms a case for the same. On any of the various rotating pivots or pinions of the clock movement, or other motor employed, I arrange a cam or eccentric, either vertically or horizontally, the position being regulated according to the movement or power employed, and the style or form of case. On this horizontally or vertically arranged cam I allow a roller or small wheel, or their equivalent, pivoted to the end of a rod, to set in a fixed position, so that the erratic movements of the cam as it rotates, will operate to raise the rod, gradually or otherwise, by its pressure under or against the small roller at the bottom end of the rod. The top end of this rod is secured to the outside sleeve tube, or at the base of the flower, which can slide up or down on the tube forming the stem of the flower. On the tube forming the stem is secured the center or petal of the flower at the top, with its numerous leaves forming the flower, hinged around its outside or under edge, and resting in a normal position on the top of the outside tube, or bell of the flower, carried by the mechanical rod. This rod, in raising or partaking of the movements of the cam, pushes up the outside tube or bell of the flower, on which the open leaves of the flower rest, and as the bell of the flower, or tube raises, it pushes upward the hinged leaves, giving the effect and appearance of the flower being closed, and as the rod descends, following the motions of the cam below, and communicated through the rod, the bell of the flower formed by the outside tube or sleeve, and attached at the top of the rod, also descends and allows the leaves to follow its movements, thereby giving the desired effect of the flower opening and resuming its normal position.

In outlining the general construction of my invention and scheme of mechanical operation, I have described the general operation, as applied to one flower, but it is not intended to limit the number of flowers, as any number of flowers may be grouped, or otherwise arranged, and be worked or controlled by the movements of the rod, actuated by the cam. This arrangement would open and close the one, or more flowers, simultaneously; but if, in using more than one flower, it is desired to open the several flowers separately, or at various intervals, then I would arrange a separate rod from each flower, any or all of them being operated by one cam, or by a special cam for each rod. If the ordinary clock movement is used as the motive power, the mechanism can be readily attached without interfering with, or preventing the use of the combination as a highly attractive and ornamental time piece.

I attain the several objects of my invention, as explained, by the construction of artificial flowers and mechanism, shown in the accompanying drawings, where to clearly describe the practical operation of my invention, I have confined my drawings to the illustration of a single flower belonging to the *Bellis perennis* or *Vitadenia* species, as the natural formation of these, and also the *Brachycome iberidifolia*, and all similar species are more desirable, though I desire it distinctly understood that I do not limit my invention, so far as the imitation of flowers is concerned, to any particular species.

Figure 3:
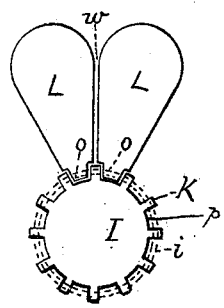
Figure 2:
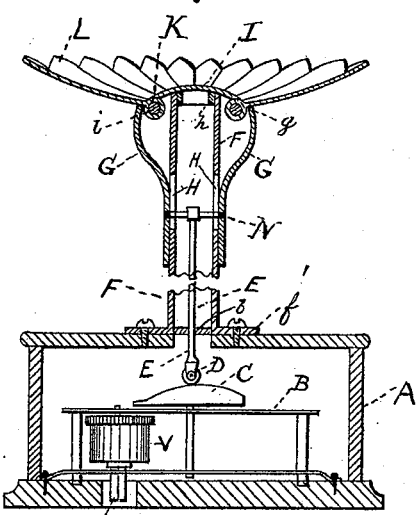
Figure 4:
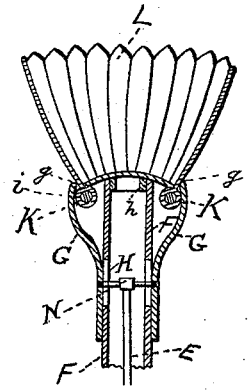

Figure 1 is a perspective of my invention, showing only one flower as adapted. Fig. 2 is a cross-section, and showing a section of the flower and its connecting mechanism on the line X X. Fig. 3 is a plan or top view of the flower and its center, showing hinged or pivoted leaves. Fig. 4 is a cross section of the flower, showing the leaves partly closed or pushed up by the bell tube, forming the bell or base of the flower.

Similar letters of reference refer to the same parts throughout the various figures.

In Fig. 1, A is the outside case or base, which may be formed in any desired manner, or that best adapted to the requirements to which my invention is to be applied. *d d* represent any desired artificial leaves or grasses, seemingly springing up and surrounding the stem of the flower F. I is the center of the flower and L the leaves, radiating from the center I.

In Fig. 2, A is a section of the outside case which may be composed of any desired material, and containing the spring power, or ordinary clock movement B, having the spring drum, or its equivalent, V, driving or operating as is usual in all clock movements driven by spring power, the shaft carrying the cam C. The tube F is formed in any desired shape best adapted to imitate the stem of the flower, and is provided with a flanged edge *f* at its base, or other suitable means of securing it to the case A. The tube or stem F rises to any desired height, and is capped at the top with the center of the flower I, the center of the flower I fitting on or into the top of the stem tube F by means of the flange *h* or its substitute. In the stem tube F at each side, there is a slot or oblong opening H, diametrically opposite to each other. Through these openings or slots H H a transverse rod N passes. This transverse rod N is securely fastened to the outside tube G which forms the bell or base of the flower. This transverse rod N at its center has the vertical rod E securely attached, and which descends the stem tube F, and passes through the guide *b*, and is provided with a small roller or wheel D which prevents any undue friction or retardation of the cam C. As the cam C is rotated or driven by the clock movement, or its equivalent, the wheel or roller D, at the end of the vertical rod E revolves on or rolls on the surface of the cammed edge, and as the cam rotates, the gradual incline of the cam face forces up the rod E, which by its connection with the transverse rod N passing through the slots H in the stem tube F, and being secured to the outside sliding tube G, forming the bell base of the flower. This tube G, or bell, is supporting the leaves L of the flower at the top edge *g*, and as the rod E is forced up by the action of the cam, and the bell tube G, partaking of its movements, the leaves L are pushed up in a closing position as shown in Fig. 4, until the flower is closed, and as the rod E, with its roller D, descends, controlled in its movements by the cam C, the bell tube G connected by the transverse rod N, and sliding freely through the slots H in the stem tube F, drops down again to its normal position, and supporting the leaves of the flower at the point *g*, the flower again being open.

In Fig. 3, I is a top view of the flower center, showing the equally divided or cut out spaces *p*, around its circumferential edge, leaving the series of divisions K which are turned under to form a loop or hinge joint. The leaves L L as shown at O O are cut out so as to conform to the spaces *p*, cut in the outside edge of the flower center I and so formed that their edges at *w* may approach closely to each other, and not show any parting or spreading apart, caused by the division K. The ends of the leaves at O O are turned under to form a loop or joint corresponding to the divisions K, and to receive the pivoting loop of wire *i*, or its equivalent, which passes through the division loops K and those formed at the inside end of the leaves at O O and thus forming the hinge on which the leaves are free to work in opening or closing.

There can be changes in the form, proportions and the minor details of construction resorted to without departing from the principle or sacrificing any of the advantages of this invention.

What I claim, and desire to secure by Letters Patent, is—

1. In an advertising device, the combination with a base pedestal, or box; of an upright tube secured to said base or box, said tube having its top closed by a detachable cover; a series of leaves hingedly connected to said cover at its outer periphery, said leaves being adapted to be raised and lowered; and means for mechanically raising and lowering said leaves substantially as described.

2. In an advertising device, the combination with a base pedestal or box; of an upright tube secured to said base or box, said tube having its top closed by a detachable cover; a series of leaves hingedly connected to said cover at its outer periphery; a tube adapted to fit over the said upright tube, the upper end of said outer tube being adapted to bear against the under side of said leaves for the purpose of raising or lowering the leaves; and means for mechanically raising and lowering said outer tube, substantially as described.

3. In an advertising device, the combination with a base pedestal or box; of an upright tube secured to said base or box, said tube having its top closed by a detachable cover, the diameter of said cover being greater than the diameter of the upper end of said upright tube; a series of leaves hingedly connected to said cover at its outer periphery; an outer tube adapted to fit over the said upright tube; the upper end of said outer tube being of greater diameter than that of the cover, the upper end of said outer tube being adapted to bear against the under side of said leaves, for the purpose of raising and lowering the leaves; and means for mechanically raising and lowering said outer tube, substantially as described.

4. In an advertising device, the combination with a base pedestal or box; said box being adapted to contain a motor; of an upright tube secured to said box, said tube having intermediate its ends, longitudinal slots formed therein at diametrically opposite points, said tube having also its top closed by a detachable cover; a series of leaves pivoted to the outer periphery of said cover, the point of connection being below the plane of said cover; an outer tube, adapted to fit over the said upright tube, the upper end of said outer tube being of greater diameter than diameter of said cover, the top of said outer tube being adapted to bear against the under side of said leaves for the purpose of raising and lowering them; a transverse bar, adapted to pass through said openings in the upright tube, and secured to said outer tube; a vertical rod attached to said transverse rod, adapted to extend downward into said base or box; and means whereby when said motor is in operation, said vertical rod will be raised and lowered, substantially as described.

In testimony whereof I have hereunto affixed my signature in the presence of two witnesses.

JOHN E. WENGER.

Witnesses:
W. C. FREW,
AMOS D. MUN.